(12) United States Patent
Shim et al.

(10) Patent No.: US 8,209,894 B2
(45) Date of Patent: Jul. 3, 2012

(54) MULTI-DISPLAY APPARATUS, METHOD OF MANUFACTURE THEREOF AND ARTICLES COMPRISING THE SAME

(75) Inventors: Hong-shik Shim, Seoul (KR); In-seo Kee, Seongnam-si (KR); Young-gu Lee, Suwon-si (KR)

(73) Assignees: Samsung Electronics Co., Ltd. (KR); Samsung Mobile Display Co., Ltd. (KR)

( * ) Notice: Subject to any disclaimer, the term of this patent is extended or adjusted under 35 U.S.C. 154(b) by 246 days.

(21) Appl. No.: 12/432,155

(22) Filed: Apr. 29, 2009

(65) Prior Publication Data

US 2010/0115807 A1 May 13, 2010

(30) Foreign Application Priority Data

Nov. 11, 2008 (KR) .................. 10-2008-0111860

(51) Int. Cl.
*G09G 5/00* (2006.01)
(52) U.S. Cl. .......................... 40/541; 345/1.3
(58) Field of Classification Search .......... 40/1, 541; 345/1.3; 361/679.28, 679.04
See application file for complete search history.

(56) References Cited

U.S. PATENT DOCUMENTS

| | | | | |
|---|---|---|---|---|
| 5,020,251 A | * | 6/1991 | Cheng | 40/735 |
| 6,377,324 B1 | * | 4/2002 | Katsura | 349/58 |
| 6,570,325 B2 | * | 5/2003 | Graff et al. | 313/506 |
| 6,577,496 B1 | * | 6/2003 | Gioscia et al. | 361/679.3 |
| 7,095,387 B2 | * | 8/2006 | Lee et al. | 345/4 |
| 7,777,415 B2 | * | 8/2010 | Yang | 313/512 |
| 2003/0026068 A1 | * | 2/2003 | Tsai et al. | 361/683 |
| 2007/0285341 A1 | * | 12/2007 | Manning | 345/1.3 |
| 2008/0224949 A1 | * | 9/2008 | Lee et al. | 345/1.3 |
| 2010/0117928 A1 | * | 5/2010 | Shim et al. | 345/1.3 |
| 2010/0201603 A1 | * | 8/2010 | Kee et al. | 345/1.3 |
| 2011/0025232 A1 | * | 2/2011 | Kee et al. | 315/297 |

FOREIGN PATENT DOCUMENTS

| | | |
|---|---|---|
| KR | 1019990050257 A | 7/1999 |
| KR | 1020060096125 | 9/2006 |
| KR | 1020060096125 A | 9/2006 |

* cited by examiner

*Primary Examiner* — Joanne Silbermann
*Assistant Examiner* — Kristina Junge
(74) *Attorney, Agent, or Firm* — Cantor Colburn LLP

(57) ABSTRACT

Provided is a multi-display apparatus formed by connecting a plurality of display devices. The multi-display apparatus includes a first display device, a second display device, and a transparent plate. The second display device may partially overlap with the first display device. The transparent plate covers at least some parts of the first display device and the second display device.

30 Claims, 3 Drawing Sheets

MULTI-DISPLAY APPARATUS, METHOD OF MANUFACTURE THEREOF AND ARTICLES COMPRISING THE SAME

CROSS-REFERENCE TO RELATED APPLICATIONS

This application claims priority to Korean Patent Application No. 10-2008-0111860, filed on Nov. 11, 2008, and all the benefits accruing therefrom under 35 U.S.C. §119, the contents of which in its entirety are herein incorporated by reference.

BACKGROUND

1. Field

Disclosed herein is a multi-display apparatus including a screen formed by connecting a plurality of display devices. This disclosure relates more particularly, to a multi-display apparatus including a plurality of display devices connected to each other in a folding type manner.

2. Description of the Related Art

In general, a multi-display apparatus includes a large screen formed by connecting a plurality of display devices. When such multi-display apparatus was first introduced for exhibition purposes, the large screen was made by connecting in series a plurality of cathode ray tubes.

In general, when manufacturing a multi-display apparatus, after a plurality of unit display devices are prepared, the units display devices are connected in series. In this case, however, an image displayed on the screen may have gaps at seams between the display devices. In addition, the image may also look disconnected due to air gaps existing between the display devices.

SUMMARY

Disclosed herein is a multi-display apparatus for realizing a natural image with reduced gaps at seams between display devices.

Additional aspects will be set forth in part in the description which follows and, in part, will be apparent from the description, or may be learned by practice of the invention.

Disclosed herein is a first display device having a first viewing portion for viewing an image; a second display device having a second viewing portion for viewing the image; and a transparent plate contacting the first viewing portion, and extending to cover at least a part of the second viewing portion.

Disclosed herein too is a apparatus including a first display device; a second display device partially overlapping the first display device; and a transparent plate surrounding at least a part of the first display device, and extending to cover at least a part of the second display device.

The transparent plate may be integrally formed with the first display device.

The first display device and the second display device may respectively include a first viewing portion and a second viewing portion, and the transparent plate may cover the first viewing portion and the second viewing portion of the first display device and the second display device.

A thickness of the transparent plate that surrounds the first display device may be larger than the first display device by about 0.002 millimeter ("mm") to about 2 millimeters.

The transparent plate may have a refractive index of about 1.0 to 2.0.

The transparent plate may be formed of an organic polymer.

In one embodiment, the transparent plate may be formed of an elastomer.

In another embodiment, the transparent plate may be formed of an organic polymer that has an elastic modulus of about $10^4$ to about $10^7$ pascals when measured at room temperature.

The soft material may be selected from the group consisting of a polyolefin, a polyacrylic, a polyacrylate, a polymethylmethacrylate, a polycarbonate, a polystyrene, a polyester, a polyarylate, a polyarylsulfone, a polyethersulfone, a polyphenylene sulfide, a polysulfone, a polyimide, a polyetherimide, a polytetrafluoroethylene, a polyetherketone, a polyether etherketone, a polyether ketone ketone, a polysiloxane, a polybutadiene, a polyisoprene, a polynitrile, or a combination thereof.

The transparent plate may further include an additive.

The multi-display apparatus may further include an optical film on an upper portion of the transparent plate.

The optical film may be at least one of a polarization film, an anti-reflection (AR) film, and an anti-glaring (AG) film.

Each of the first and second display devices may include a substrate, a viewing portion, and a cover for protecting the viewing portion.

A refractive index of the cover for protecting the display device and the refractive index of the transparent plate may both be in a range of about 1.0 to about 2.0.

The refractive index of the cover protecting the display device and the refractive index of the transparent plate may be equal to each other.

The substrate of the first display device may include two regions, a first region and a second region that have different thicknesses from each other, the second region being at a boundary of the first display device with the second display device. The second region is thinner than the first region.

The transparent plate may surround the substrate of the first display device at the second region.

The first and second display devices may be connected to each other to be folded or unfolded. In one embodiment, the transparent plate is monolithic.

The transparent plate may be bent when the first and second display devices are folded.

The display devices included in the first and second display devices may be one of a liquid crystal display ("LCD"), a field emission display ("FED"), a plasma display panel ("PDP"), and an organic light-emitting diode ("OLED").

To achieve the above and/or other aspects, one or more embodiments may include a display apparatus including a first display device; a second display device partially overlapping with the first display device; and a transparent plate that is integrally formed with the first display device and extends to cover at least a part of the second display device.

To achieve the above and/or other aspects, one or more embodiments may include a display apparatus including a first display device; a second display device partially overlapping the first display device; and a transparent plate surrounding the surfaces of the first display device and extending to cover at least a part of the second display device.

BRIEF DESCRIPTION OF THE DRAWINGS

The above and other aspects, advantages, and features of the invention will become more apparent by describing in further detail exemplary embodiments thereof with reference to the attached drawings, in which.

DETAILED DESCRIPTION

Figure 1:
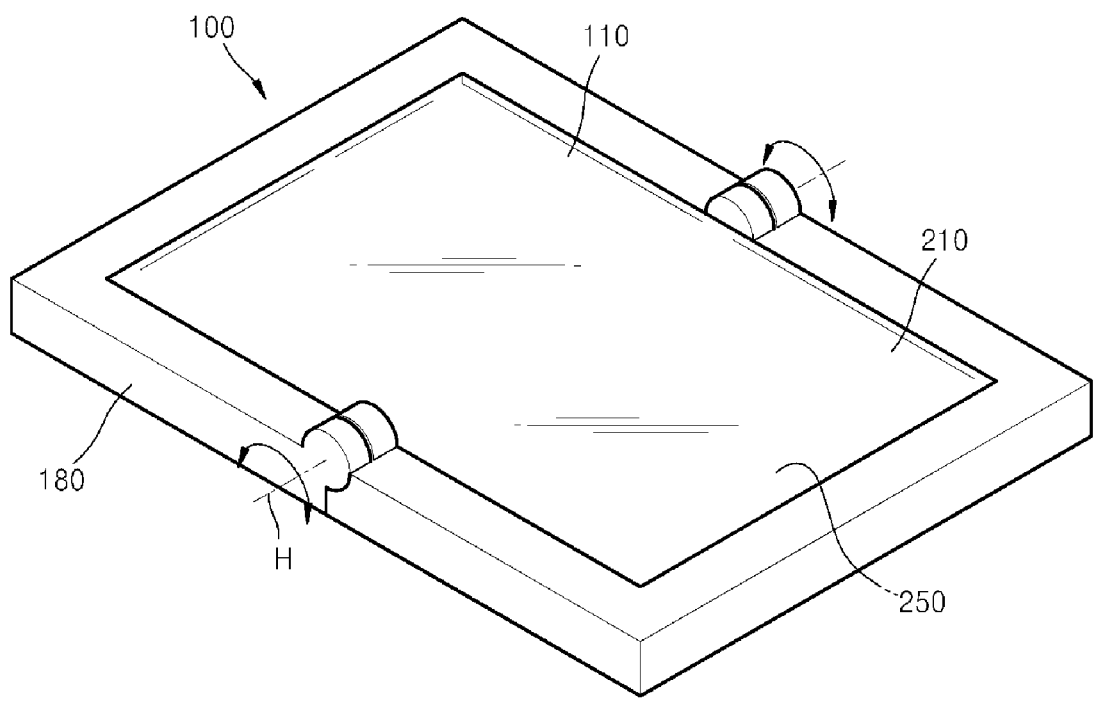
FIG. 1 is an exemplary diagram of a multi-display apparatus.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below by referring to the figures, to explain aspects of the present description.

Aspects, advantages, and features of exemplary embodiments of the invention and methods of accomplishing the same may be understood more readily by reference to the following detailed description of embodiments and the accompanying drawings. These embodiments are provided so that this disclosure will be thorough and complete and will fully convey the concept of the invention to those skilled in the art, and the exemplary embodiments of the invention will only be defined by the appended claims.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation can result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 2:
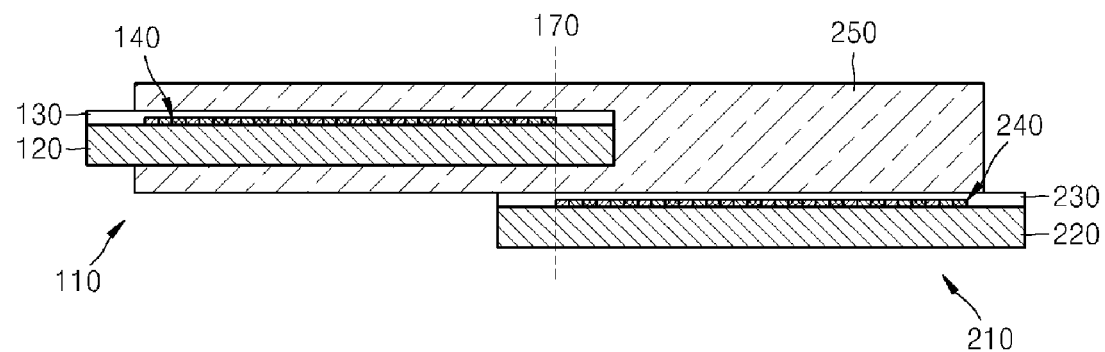
FIG. 2 is an exemplary cross-sectional view schematically showing a connection structure between unit display devices and transparent plates depicted in the exemplary multi-display apparatus of FIG. 1.

FIGS. 1 and 2 show a multi-display apparatus 100 according to an embodiment. The multi-display apparatus 100 may be fabricated by connecting a plurality of display devices in various ways, however, only two display devices 110 and 210 are show in the FIGS. 1 and 2. In addition, each display devices 110 and 210 includes a first viewing portion 140 and a second viewing portion 240 for displaying images. The viewing portions 140 and 240 are also referred to as screens.

While the FIGS. 1 and 2, depict two display devices as being connected, three or more display devices may be connected to form a screen in the same way.

The first and second display devices 110 and 210 respectively include the first and second viewing portions 140 and 240 stacked on first and second substrates 120 and 220 respectively, with first and second covers 130 and 230 respectively protecting the viewing portions 140 and 240 as shown in FIG. 2. The multi-display apparatus 100 may be of a top emission type, and in this case the images formed by the first and second viewing portions 140 and 240 respectively are displayed through the first and second covers 130 and 230 respectively. The multi-display apparatus 100 may also be of a bottom emission type, in which case the images formed by the first and second viewing portions 140 and 240 are displayed through the first and second substrates 120 and 220 respectively. In FIGS. 1 and 2, for example, the multi-display apparatus 100 is of a top emission type. The first and second viewing portions 140 and 240 built in the first and second display devices 110 and 210 may be flat display devices such as liquid crystal displays ("LCDs"), field emission displays ("FEDs"), plasma display panels ("PDPs"), or organic light emitting diodes ("OLEDs").

As can be seen in the FIGS. 1 and 2, the first and the second display devices 110 and 210 contact one another. In one embodiment, the display devices 110 and 210 may be fixedly connected to each other. In another embodiment, the display devices 110 and 210 may be connected to each other in a folding manner. In other words, the first and the second display devices 110 and 210 may be folded and unfolded based around a hinge axis H in order to realize a screen as shown in FIG. 1. When the display devices 110 and 210 are connected to each other in a manner that permits them to be folded, some parts of the display devices 110 and 210 may overlap with each other in up and down directions in an unfolded state as shown in FIG. 2. When some parts of the display devices 110 and 210 overlap each other so that boundaries of the viewing portions 140 and 240 are located on a vertical line 170, an image displayed by the display devices 110 and 210 will look continuous when seen in a direction perpendicular to the viewing surface of the viewing portions 140 and 240. The viewing surface is the surface from which the image is viewed by a viewer. However, in this case, a viewer may perceive a vertical stepwise separation between the display devices 110 and 210. To address this issue, and to mitigate the perception of a vertical stepwise separation between the display devices 110 and 210, the multi-display apparatus 100 may further include a transparent plate 250 that contacts the first and second viewing portions 140 and 240. In one embodiment, the transparent plate 250 surrounds the entirely or almost entirely the upper display device 110. In another embodiment, the transparent plate 250 may be integrally formed with the display device 110, and may surround the entire upper surface of the display device 110. When a body 180 of the multi-display apparatus 100 covers part of the upper portion of the display device 110, it is not desirable that the transparent plate 250 cover entirely the upper surface of the first display device 110. At least a part of the transparent plate 250 extends toward an upper surface of the second display device 210. In FIGS. 1 and 2, the transparent plate 250 extends to cover entirely the second viewing portion 240 of the second display device 210. The transparent plate 250 may extend to cover entirely the upper surface of the second display device 210. When the body 180 of the multi-display apparatus 100 covers only partially an upper part of the second display device 210, the extending portion of the transparent plate 250 does not cover entirely the upper surface of the second display device 210.

The transparent plate 250 may be formed of a soft material that is flexible and elastic so that the first and the second display devices 110 and 210 may be folded. In one embodiment, the transparent plate 250 may comprise an optically transparent material having a refractive index of about 1.0 to about 2.0. The transparent plate 250 may comprise an organic polymer. Organic polymers can be thermoplastic polymers, blends of thermoplastic polymers, thermosetting polymers or a blend of a thermoplastic polymer with a thermosetting polymer. It is desirable for the organic polymer to be an elastomer having an elastic modulus of about $10^4$ to about $10^7$ pascals when measured at room temperature.

In one embodiment, the transparent plate 250 can be a polyolefin, a polyacrylic, a polyacrylate, a polymethylmethacrylate, a polycarbonate, a polystyrene, a polyester, a polyarylate, a polyarylsulfone, a polyethersulfone, a polyphenylene sulfide, a polysulfone, a polyimide, a polyetherimide, a polytetrafluoroethylene, a polyetherketone, a polyether etherketone, a polyether ketone ketone, a polysiloxane, a polybutadiene, a polyisoprene, a polynitrile, or a combination comprising at least one of the foregoing polymers. An exemplary polymer is a polysiloxane. An exemplary polysiloxane is a polydimethylsiloxane.

Figure 3:
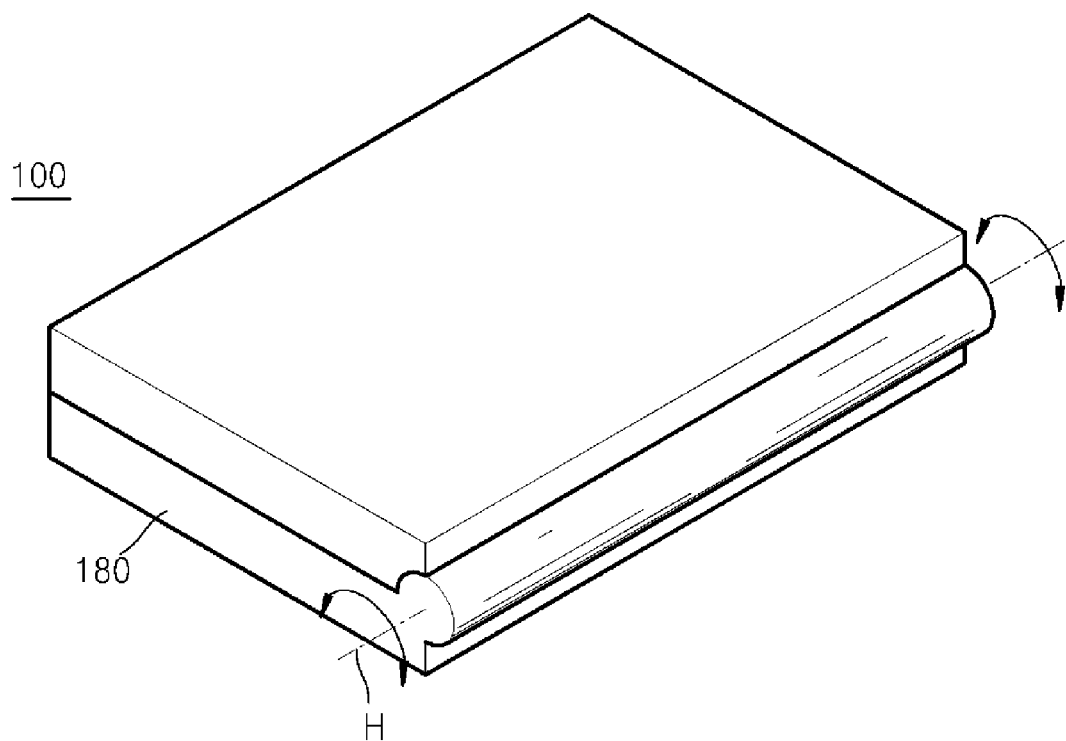
FIG. 3 is an exemplary perspective view (in a folded state) of the multi-display apparatus of FIG. 1.
Figure 4:
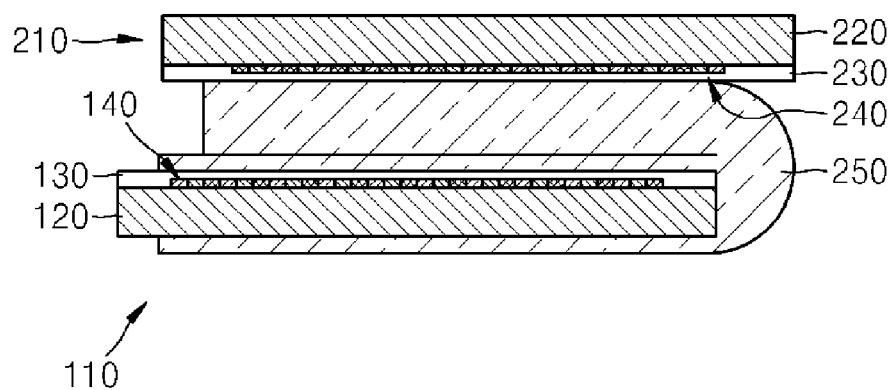
FIG. 4 is an exemplary cross-sectional view (in a folded state) of the multi-display apparatus of FIG. 1 in a folded state.

FIGS. 3 and 4 are an exemplary perspective view and a cross-sectional view respectively showing the multi-display apparatus 100 shown in FIGS. 1 and 2 in a folded state. In FIG. 3, since the display devices 110 and 210 and the transparent plate 250 are disposed in the body 180, the folding of the transparent plate 250 cannot be viewed from outside the body 180. Referring to FIG. 4, since the transparent plate 250 is formed of an elastomer, the transparent plate 250 may be easily bent when the two display devices 110 and 210 are folded. In FIG. 4, it is shown that the thickness of the transparent plate 250 is large, however, the transparent plate 250 is actually thin and thus may be easily bent as shown in FIGS. 3 and 4. The thickness of the transparent plate 250 will be described later.

In addition, an appropriate additive may be further included in the material for forming the transparent plate 250 in order to adjust a refractive index of the transparent plate 250. Examples of suitable fillers are titanium dioxide ($TiO_2$), silica ($SiO_2$), zirconia ($ZrO_2$), or the like, or a combination comprising at least one of the foregoing particles. An exemplary filler that is added to the transparent plate 250 is titanium dioxide. It is desirable for the filler to have average particle sizes that are in the nanometer range to minimize any light scattering from the image. In one embodiment, it is desirable for the filler particles to have an average particle size of less than or equal to about 500 nanometers and specifically less than or equal to about 100 nanometers. Since the transparent plate 250 is fabricated using an elastomer, when the transparent plate 250 and the first display device 210 overlap with each other, the transparent plate 250 and the first display device 210 may be in close contact with each other due to the elastic compression of the elastomer.

As shown in FIGS. 1 and 2, when the first display device 110 is inserted in the transparent plate 250, an air gap between the first display device 110 and the transparent plate 250 is eliminated. In one embodiment, the air gap between the first display device 110 and the transparent plate 250 is minimized cue to the insertion of the first display device 110 into the transparent plate 250. Therefore, a separation gap between the two display devices 110 and 210 generated due to the light diffusion or due to the total reflection of light in the air gap may be removed.

In addition, when the transparent plate 250 extends to the second viewing portion 240 that is a light emitting region of the second display device 210, the entire upper surface of the multi-display apparatus 100 may be maintained at a constant height. Therefore, the vertical stepwise separation between the first display device 110 and the second display device 210 may be reduced or removed. To do this, as shown in FIGS. 1 and 2, the transparent plate 250 may cover both of the first and second viewing portions 140 and 240, which are light emitting regions of the first and second display devices 110 and 210 respectively. Therefore, the size of the transparent plate 250 may be equal to or less than the entire light emitting regions of the first and the second display devices 110 and 210.

The transparent plate 250 may be formed integrally with the first display device 110. For example, when the transparent plate 250 is formed from a silicone resin (e.g., polysiloxane), the first display device 110 is put into a mold, and then, a liquid silicon resin may be hardened thereon. Then, the first display device 110 is integrally sealed in the transparent plate 250. An extension of the transparent plate 250 is then disposed upon the second display device 210 thereby forming the multi-display apparatus.

In another embodiment, the first display device 110 of the multi-display apparatus 100 may be surrounded by the transparent plate 250 as follows. First, the first display device 110 including the first viewing surface such as the LCD, FED, PDP, or OLED is prepared. After that, an organic polymer is disposed in a solution to form a mixture. The mixture is poured into the mold, and the display device 110 is dipped into the mixture in the mold. After surrounding the display device 110 with the mixture, the mixture is hardened using an appropriate hardening process. For example, an ultraviolet (UV) setting method or a thermosetting method may be used to harden the organic polymer. In one embodiment, the hardening is accomplished by curing the organic polymer. In another embodiment, the hardening is accomplished by evaporating the solvent and any other liquids that are contained in the organic polymer. A combination of curing and evaporation may also be used to harden the organic polymer. After that, the product in the mold is ejected, thereby obtaining the transparent plate 250 surrounding the first display device 110. An extended portion of the transparent plate 250 obtained during the molding process is disposed upon the second display device 210 to form the apparatus.

Thickness of the transparent plate 250 may vary depending on a thickness of the first display device 110. For example, the total thickness of the first display device 110 with the transparent plate 250 disposed thereon may have a thickness of about 0.01 millimeter ("mm") to about 3 mm. It is advantageous that the thickness of the transparent plate 250 be larger than the thickness of the first display device 110 by about 0.002 mm to about 2 mm. The portion of the transparent plate 250, which surrounds the first display device 110, may have a thickness of about 0.001 mm to about 1 mm from each of the upper surface and the lower surface of the first display device 110, and the portion of the transparent plate 250, which extends from its upper surface to the upper surface of the display device 210, may have a thickness of about 0.012 mm to about 5 mm.

It is also advantageous to have the refractive index of the cover 130 of the first display device 110 and the refractive index of the transparent plate 250 be substantially equal to one another so that light is not refracted at an interface between the cover 130 disposed on the first display device 110 and the transparent plate 250. Even if the refractive indexes of the cover 130 and the transparent plate 250 are not equal to each other, the refractive indexes of the cover 130 and the transparent plate 250 may be similar to each other so that light refraction rarely occurs. When there is a difference between the refractive indices of the cover 130 and the transparent plate 250, it is desirable that this difference be about less than or equal to about 0.05, specifically less than or equal to about 0.1. As noted above, the refractive index of the transparent plate 250 may be in a range of about 1.0 to about 2.0.

In addition, in order to improve the characteristics of the multi-display apparatus 100, a predetermined optical film (not shown) may be further attached to an upper portion of the soft transparent plate 250. This optical film may be used depending upon the uses of the multi-display apparatus 100. For example, a polarization film, an anti-reflection (AR) film, or an anti-glaring (AG) film may be attached to an entire surface of the transparent plate 250.

Figure 5:
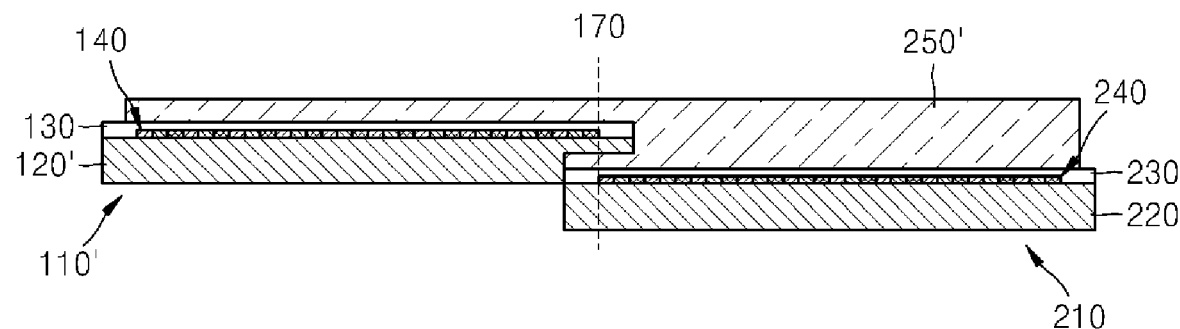
FIG. 5 is an exemplary cross-sectional view schematically showing a connection structure between unit display devices and transparent plates in a multi-display apparatus.

FIG. 5 is an exemplary cross-sectional view of the structures that connect the respective display devices with the transparent plate disposed upon them. Referring to FIG. 5, a substrate 120' that hosts the first display device 110' has a portion that is proximate to the second display device 210. The thickness of the first display device 110' is generally thicker than the portion that is proximate to the second display device 210. In other words, the substrate 120' of the first display device 110' has two portions having different thicknesses from each other, and portion that is proximate to (or adjacent to) the second display device 210 is thinner than the remainder of the first display device 110' that is further from the second display device 210. In this case, a transparent plate 250' does not surround entirely the first display device 110', but surrounds entirely or partially the upper surface and a part of the lower surface having the reduced thickness. As shown in the FIG. 5, the transparent plate 250' surrounds the cover 130 of the first display device 110' so as to cover the first viewing portion 140 that is the light emitting region of the first display device 110' (similar to the embodiment shown in FIG. 2). However, the transparent plate 250' of the present embodiment is different from that of FIG. 2, in that the transparent plate 250' only surrounds the thin portion of the substrate 120' of the first display device 110'. Other components shown in FIG. 5 are similar to those of FIG. 2.

According to the embodiment shown in FIG. 5, since the substrate 120' of the first display device 110' is thinner near the boundary between the two display devices 110' and 210, the vertical stepwise separation between light emitting regions of the first display device 110' and the second display device 210 may be reduced. Therefore, the separation gap in the image between the two display devices 110' and 210 may be reduced further.

Figure 6:
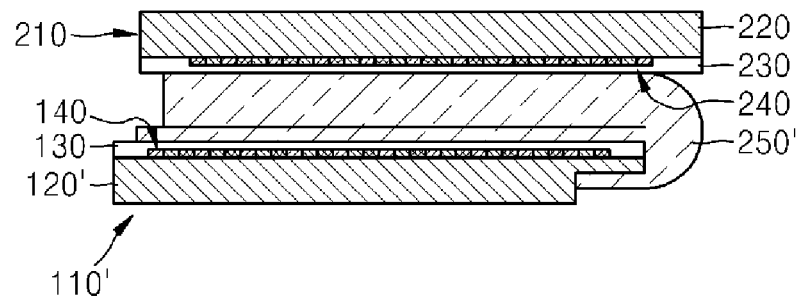
FIG. 6 is an exemplary cross-sectional view (in a folded state) of the multi-display apparatus of FIG. 5.

FIG. 6 is an exemplary depiction showing the multi-display apparatus of FIG. 5 in a folded state. Like the embodiment shown in FIG. 4, since the transparent plate 250' is formed of an elastomer, the transparent plate 250' may be bent easily when the two display devices 110' and 210 are folded. Since the transparent plate 250' of FIG. 6 is thinner than the transparent plate 250 of FIG. 4, the multi-display apparatus of FIG. 6 may be folded easier than that of FIG. 4.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. An apparatus comprising:
a first display device having a first viewing portion for viewing an image;
a second display device having a second viewing portion for viewing the image; and
a transparent plate partially surrounding the first display device, and contacting a portion of both a top surface and a bottom surface of the first display device while concurrently contacting a portion of a top surface of the second display device, wherein the transparent plate includes an intermediate portion which is intermediate the first and the second display devices with respect to a viewing angle that is perpendicular to the top surfaces of the first or second viewing portions.

2. The apparatus of claim 1, wherein the second display device overlaps a portion of the first display device.

3. The apparatus of claim 1, wherein the transparent plate is monolithic.

4. The apparatus of claim 1, wherein the transparent plate at least partly surrounds at least a part of the second display device.

5. The apparatus of claim 1, wherein the transparent plate is integrally formed with the second display device.

6. The apparatus of claim 1, where the image does not contain any breaks or seams as a result of being displayed across the first display device and the second display device.

7. The apparatus of claim 1, wherein the transparent plate comprises an organic polymer.

8. The apparatus of claim 7, wherein the organic polymer is polydimethylsiloxane.

9. The apparatus of claim 7, wherein the organic polymer has a refractive index of about 1.0 to about 2.0.

10. The apparatus of claim 7, wherein the organic polymer has an elastic modulus of about $10^4$ to about $10^7$ pascals when measured at room temperature.

11. An apparatus comprising:
a first display device;
a second display device partially overlapping the first display device; and
a transparent plate at least partly surrounding at least a part of the second display device, and contacting both a top surface and a bottom surface of the second display device while concurrently contacting a top surface of the first display device,
wherein the transparent plate includes an intermediate portion which is intermediate the first display device and the second display device with respect to a viewing angle that is perpendicular to the top surfaces of the first or second display device.

12. The apparatus of claim 11, wherein the transparent plate is integrally formed with the second display device.

13. The apparatus of claim 11, wherein the first display device and the second display device respectively include a first viewing portion and a second viewing portion, and the transparent plate covers the first viewing portion and the second viewing portion of the first display device and second display device.

14. The apparatus of claim 11, wherein a thickness of the transparent plate that at least partly surrounds the second display device is larger than that of the first display device by about 0.002 millimeter to about 2 millimeter.

15. The apparatus of claim 11, wherein the transparent plate has a refractive index of about 1.0 to 2.0.

16. The apparatus of claim 11, wherein the transparent plate comprises an organic polymer.

17. The apparatus of claim 11, wherein the transparent plate comprises an elastomer.

18. The apparatus of claim 16, wherein the organic polymer is a thermoplastic resin, a blend of thermoplastic resins, a thermosetting resin, or a blend of a thermoplastic resin with a thermosetting resin.

19. The apparatus of claim 16, wherein the organic polymer is a polyolefin, a polyacrylic, a polycarbonate, a polystyrene, a polyester, a polyarylate, a polyarylsulfone, a polyethersulfone, a polyphenylene sulfide, a polysulfone, a polyimide, a polyetherimide, a polytetrafluoroethylene, a polyetherketone, a polyether etherketone, a polyether ketone ketone, a polysiloxane, a polybutadiene, a polyisoprene, a polynitrile, or a combination comprising at least one of the foregoing polymers.

20. The apparatus of claim 11, wherein the transparent plate further includes an additive.

21. The apparatus of claim 16, further comprising an optical film on an upper portion of the transparent plate.

22. The apparatus of claim 21, wherein the optical film is at least one of a polarization film, an anti-reflection (AR) film, and an anti-glaring (AG) film.

23. The apparatus of claim 11, wherein each of the first and second display devices includes a substrate and a cover for protecting the display device.

24. The apparatus of claim 23, wherein a refractive index of the cover protecting the first and second display device and the refractive index of the transparent plate are in a range of about 1.0 to about 2.0.

25. The apparatus of claim 23, wherein the refractive index of the cover protecting the first and second display device and the refractive index of the transparent plate are equal to each other.

26. The apparatus of claim 11, wherein the first and second display devices are connected to each other to be folded or unfolded.

27. An apparatus comprising:
a first display device;
a second display device partially overlapping the first display device; and
a transparent plate integrally formed with and partially surrounding the second display device and contacting both a top surface and a bottom surface of the second display device while concurrently contacting a portion of a top surface of the first display device,
wherein the transparent plate includes an intermediate portion which is intermediate the first display device and the second display device with respect to a viewing angle that is perpendicular to the top surfaces of the first or second display device.

28. The apparatus of claim 27, wherein the first display device and the second display device respectively include a first viewing portion and a second viewing portion, and the transparent plate covers the first viewing portion and the second viewing portion of the first display device and second display device.

29. The apparatus of claim 27, wherein the transparent plate comprises polydimethylsiloxane.

30. The apparatus of claim 27, wherein the transparent plate at least partly surrounds at least a part of the second display device.

* * * * *